United States Patent [19]
McCandless

[11] Patent Number: 5,329,285
[45] Date of Patent: Jul. 12, 1994

[54] DUALLY POLARIZED MONOPULSE FEED USING AN ORTHOGONAL POLARIZATION COUPLER IN A MULTIMODE WAVEGUIDE

[75] Inventor: Jay H. McCandless, Issaquah, Wash.
[73] Assignee: The Boeing Company, Seattle, Wash.
[21] Appl. No.: 732,399
[22] Filed: Jul. 18, 1991
[51] Int. Cl.[5] .............................................. G01S 13/44
[52] U.S. Cl. ................................ 342/153; 333/21 R; 333/115
[58] Field of Search ............ 342/153, 188; 333/21 R, 333/115

[56] References Cited

U.S. PATENT DOCUMENTS

| | | |
|---|---|---|
| 3,274,604 | 9/1966 | Lewis ................................ 342/153 |
| 3,560,976 | 2/1971 | Foldes ............................... 342/153 |
| 4,030,048 | 6/1977 | Foldes ............................... 342/153 |
| 4,420,756 | 12/1983 | Hamada et al. .................... 342/153 |
| 4,849,761 | 7/1989 | Thomas ............................. 342/153 |

Primary Examiner—Mark Hellner
Attorney, Agent, or Firm—Kenneth J. Cooper

[57] ABSTRACT

A dually polarized monopulse feed system for processing radar signal information from a target so the target may be identified and tracked includes a symmetrical multimode input waveguide, a coupler for separating polarized modes of signal waves to identify and track the target, waveguides for rejecting and terminating selected polarized modes of signal waves, and a backshort for reflecting selected polarized modes of signal waves.

12 Claims, 10 Drawing Sheets

DUALLY POLARIZED MONOPULSE FEED USING AN ORTHOGONAL POLARIZATION COUPLER IN A MULTIMODE WAVEGUIDE

SUMMARY OF THE INVENTION

Demand is increasing for compact radar systems which can identify and track targets. The invention identifies and tracks targets by separating and analyzing reflected radar signal information from the target. That information is collected by the invention's dually polarized monopulse feed system which uses an orthogonal polarization coupler in a multimode waveguide. The system includes an antenna for collecting the radar signal information, a coupler for separating polarized modes of signal waves, sized waveguides for rejecting and terminating selected polarized modes of signal waves, and a backshort for reflecting selected polarized modes of signal waves. This system can be adapted to any frequency and will be sized accordingly. An effective system designed for 35 GHz radar frequencies has been built within a three cubic inch structure.

DETAILED DESCRIPTION

- Millimeter wave frequency radar systems are increasingly attractive because the system allows improved target identification and tracking with more compact antenna systems. Space is crucial in modern applications. Consequently, such applications demand smaller and more efficient radar systems. Additionally, costs continue to be a paramount concern. The invention's design is simpler, easier to build, easier to replicate, smaller in volume, more adaptable to different frequencies and applications, and less costly than contemporary designs performing similar target identification and tracking.

Dually polarized monopulse antenna feed systems 20 (FIG. 1) traditionally include four symmetrical horns 22 which capture incoming radar signals. The signals are separated by their vertical and horizontal polarizations by an orthogonal mode transducer. The signal outputs from the orthogonal mode transducer feed into a monopulse comparator. The comparator generates sum and difference outputs for radar system analysis so a target can be identified and tracked. This system requires eight hybrid combiners, four orthogonal mode transducers, and a complicated waveguide interconnect system. The resulting structure, designed for millimeter wave radar frequencies, would typically occupy a volume of approximately thirty cubic inches without including the horns 22. Such a size would exclude the system from likely use in many applications.

Figure 1:
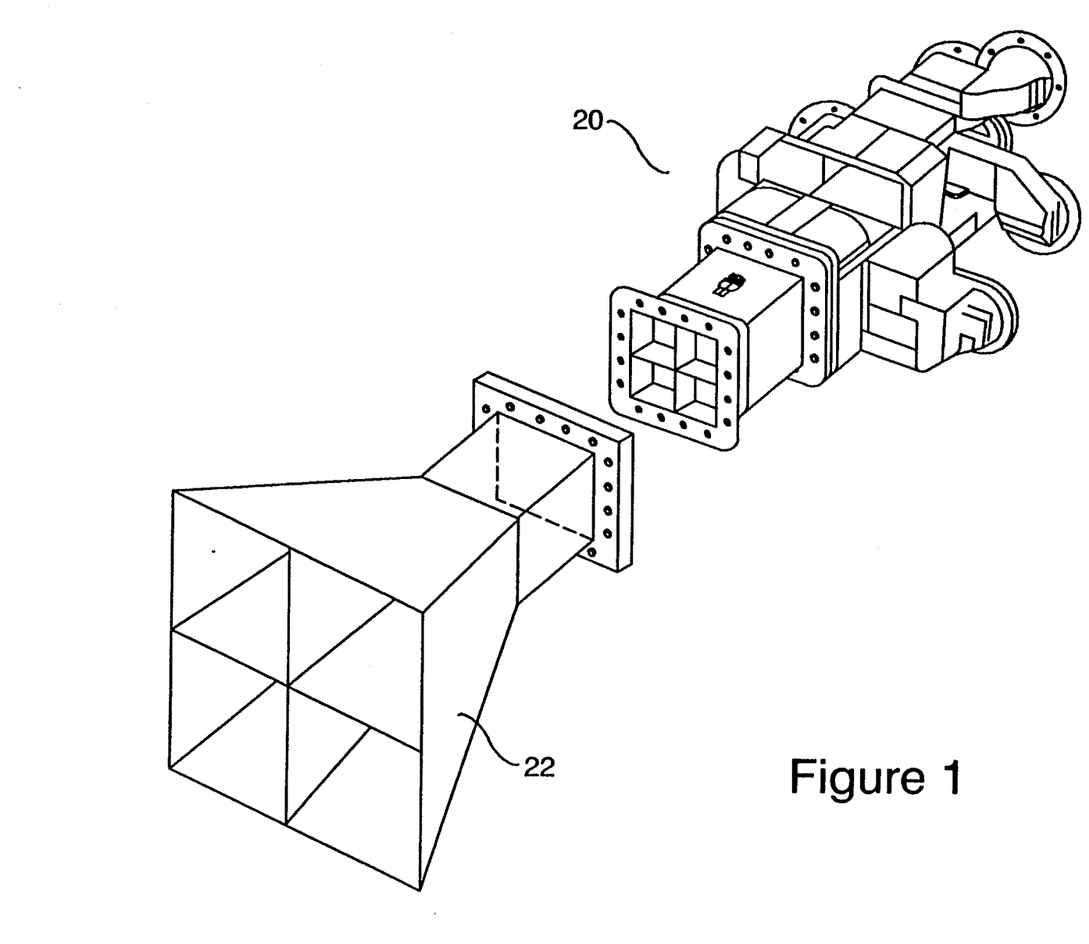
FIG. 1 depicts a commercially available dually polarized monopulse feed with a custom horn assembly.
Figure 2:
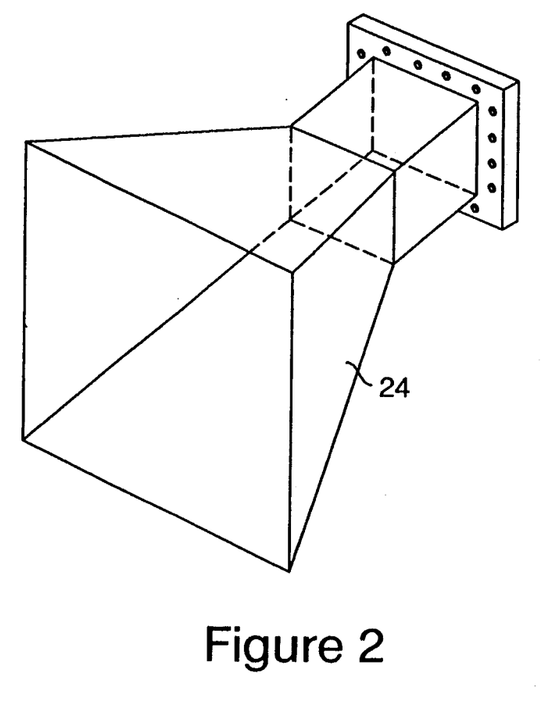
FIG. 2 shows a multimode horn and waveguide.
Figure 3A:
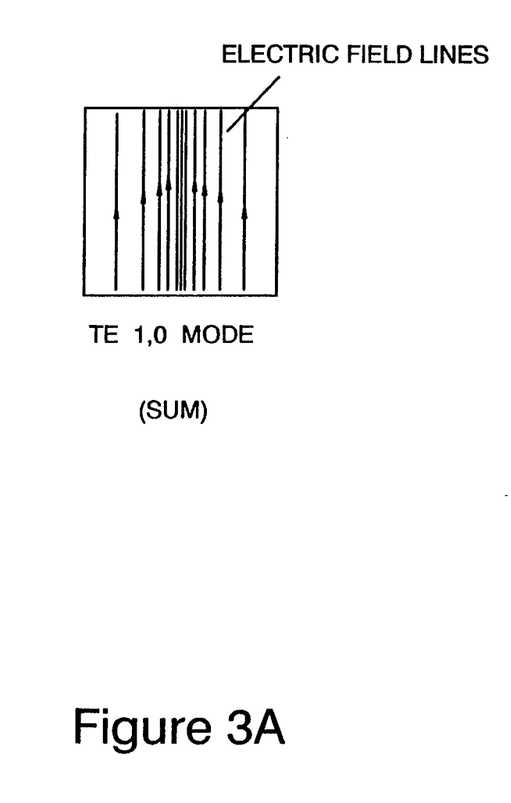
FIGS. 3A, 3B, and 3C depict a dually polarized monopulse feed system.
Figure 3B:
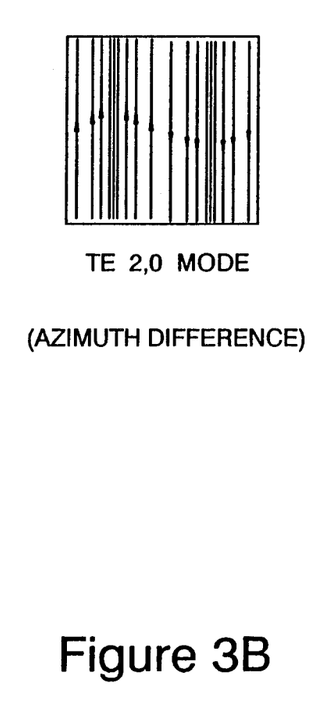
Figure 3C:
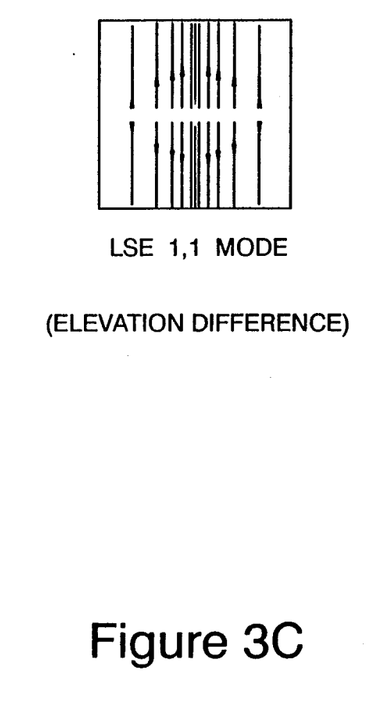

An improvement of the above system resulted by replacing the four horns 22 with a single multimode horn and waveguide 24 (FIG. 2). The deficiency of this system, however, occurred with coupling off the appropriate signal mode for each sum and difference channel. Compensating designs included matching the multimode waveguide 24 into four symmetrical, dually polarized waveguides and then channelling the signals to the dual polarization waveguide comparator network of the previously described antenna feed system 20 (FIG. 1). The complex designs of systems 20 and 24 make their quantity production impractical for millimeter wave frequency application (see "Multimode Corrigated Waveguide Feed For Monopulse Radar," Clarricoats and Elliot, IEE PROC. H(GB), VOL. 128, NO. 2, PP. 102-10 April 1981).

Reviewed patents have not disclosed a compact, efficient package having the invention's twin features of dual polarization for target identification and azimuth and elevation monopulse for target tracking. Instead, the Morz U.S. Pat. No. 4,047,128, discloses a complex feed system for processing radar signals of dual polarization and two frequencies with tracking ability in only one plane. Hamada et al, U.S. Pat. No. 4,420,756, discloses a feed system which transmits one frequency, receives a different frequency, tracks in both planes, but only receives one polarization.

The invention (FIG. 4) has been designed into a three cubic inch volume for a 35 GHz radar system. This package size makes the invention useful in numerous applications where space is limited but performance is critical.

The invention (FIG. 4) captures an incident signal 25 in antenna 26 which may be a horn. The signal 25 may originate from a reflecting target, a cassegrain antenna, or a focusing lens. The incident signal 25 has two orthogonal components with horizontal and vertical polarizations. Target tracking relies on the horizontally polarized signal while target identification relies on the fundamental modes of the horizontally and vertically polarized signal waves.

Figure 4:
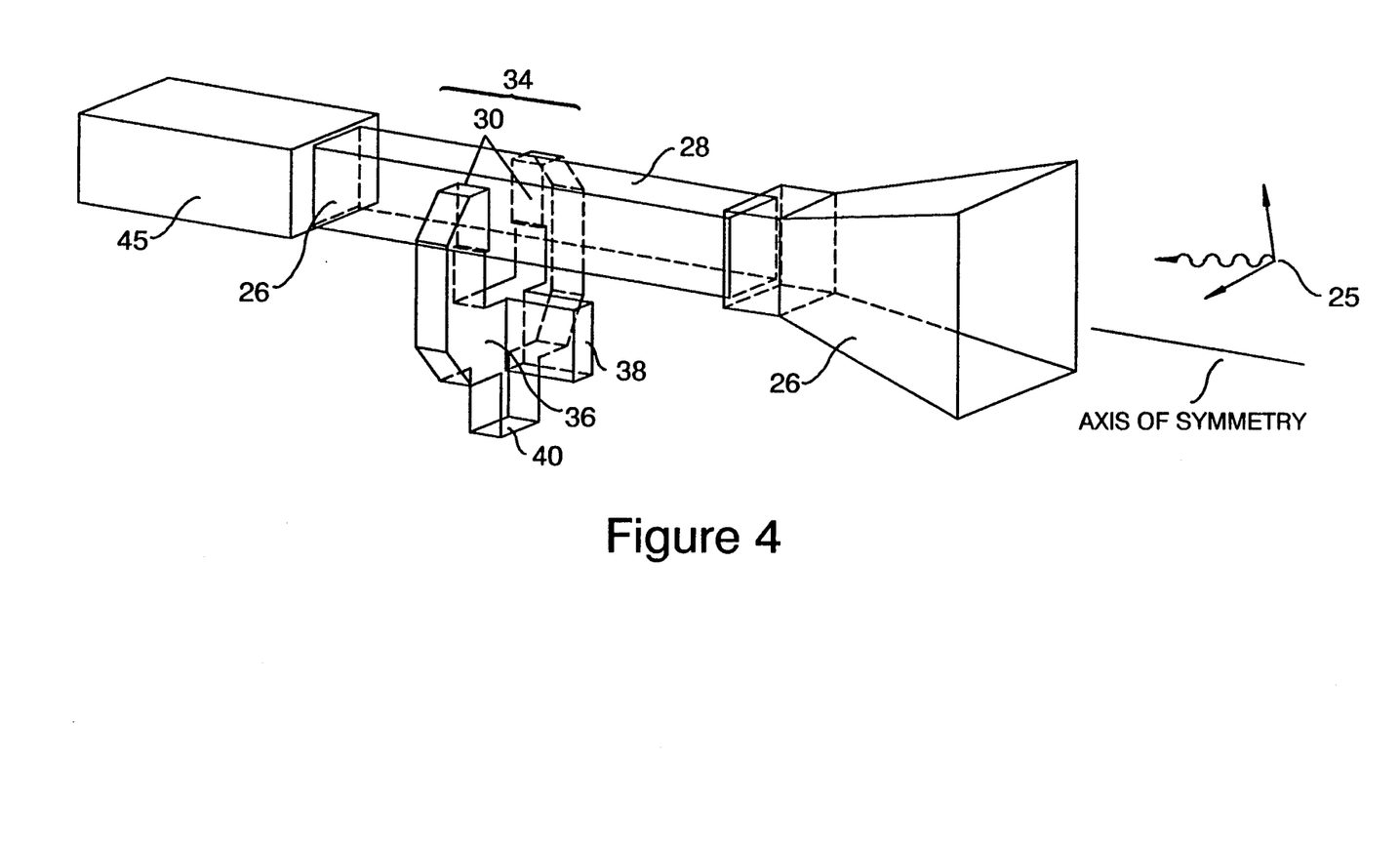
FIG. 4 shows the coupler of the dually polarized monopulse feed system, the coupler having a standing wave of an incident signal.

The antenna 26 feeds the fundamental and two higher order modes of the incident signal 25 to the symmetrical multimode input waveguide 28. The incident signals 25 enter antenna 26 at an angle which is off-normal in both the azimuth and elevation planes. These incident signals 25 set up higher order modes in the symmetrical multimode input waveguide 28 downstream from antenna 26. The proportion of higher order modes to the fundamental mode of the incident signal 25 is determined by the angle off-normal to the antenna 26.

The fundamental and two higher order modes of the horizontal and vertical polarizations of incident signals 25 must be separated to extract meaningful information from the incident signals 25. Quality isolation yields quality information about the identity and position of the target being tracked.

Figure 5:
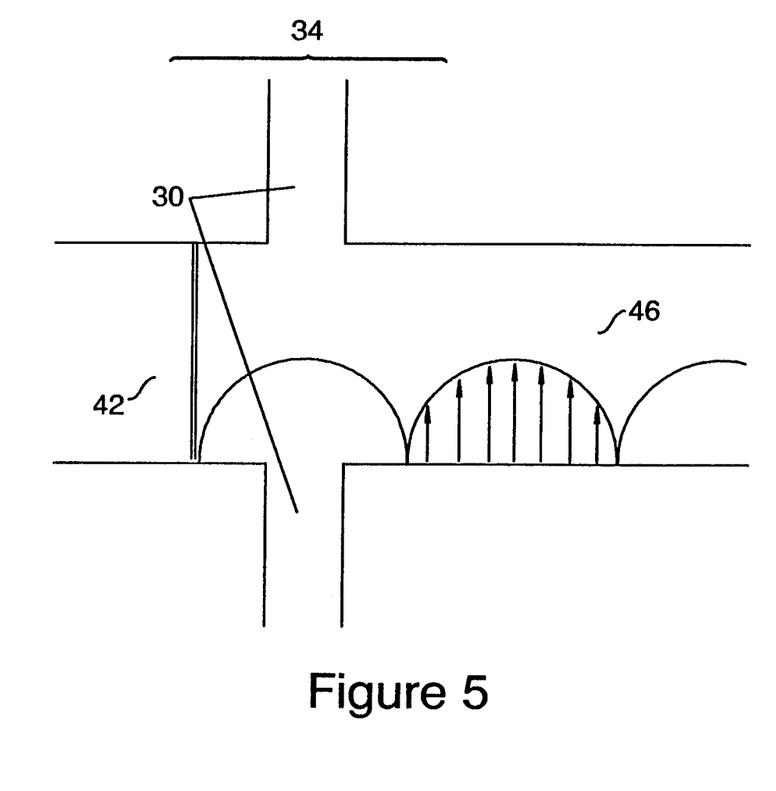
FIG. 5 shows the preferred embodiment of the dually polarized monopulse feed system.
Figure 6:
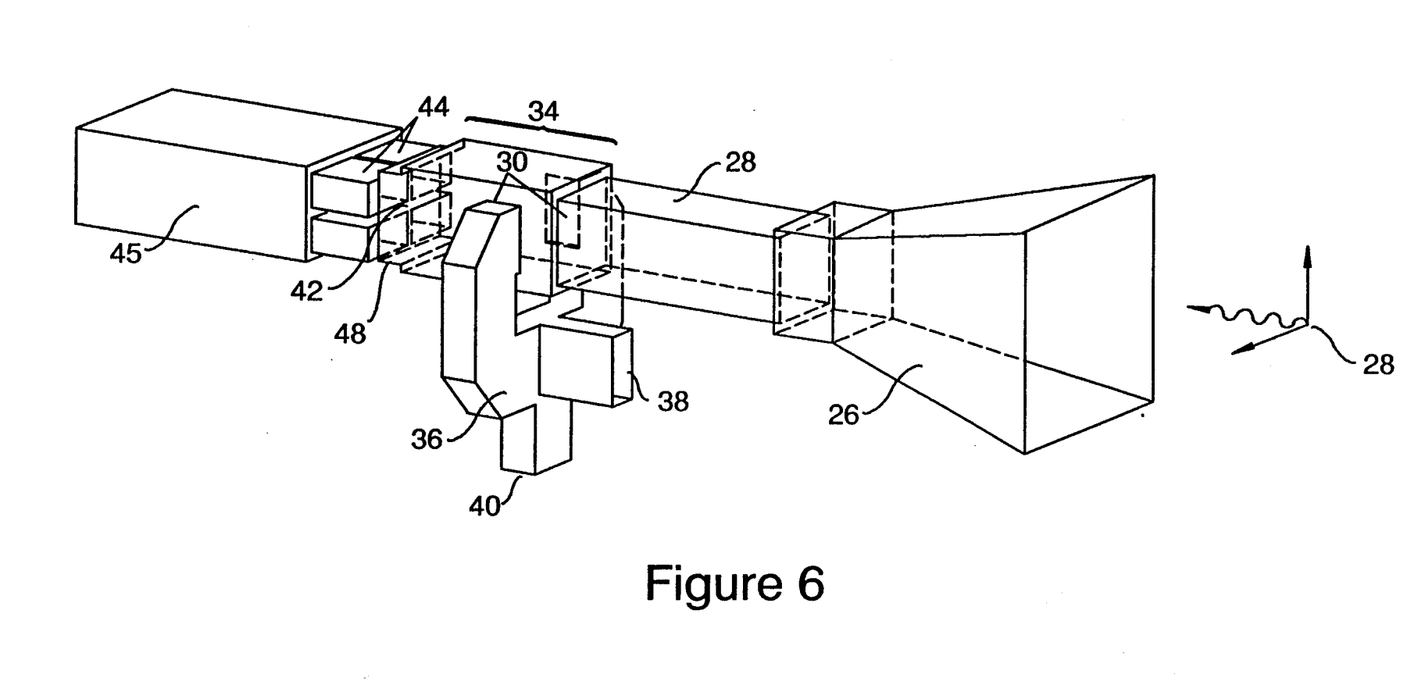
FIG. 6 shows a full view of the dually polarized monopulse feed system.

The fundamental mode of the vertically polarized component of the incident signal 25 is separated with two opposing rectangular waveguide apertures 30 (FIG. 5) normal to the symmetrical multimode input waveguide 28 (FIG. 4) downstream from antenna 26. The portion of the invention having the opposing rectangular waveguide apertures 30 and symmetrical multimode input waveguide 28 is the coupler 34 (FIG. 6). The purpose of coupler 34 is to capture the fundamental mode of the vertically polarized component of the incident signal 25 so the captured signals in both opposing rectangular waveguide apertures 30 can be combined in a magic tee 36 and the output summed in the difference arm 38.

The orientation of the opposing rectangular waveguide apertures 30 along symmetrical multimode input waveguide 28 determines the quality of signal isolation. Horizontally polarized incident signals 25 see the narrow opening of those apertures 30 and cannot penetrate them.

The two higher order modes of the vertically polarized incident signal 25 are likewise rejected by the opposing rectangular waveguide apertures 30 but for a different reason. These signals can penetrate the apertures 30 and can either be terminated in a load in the sum port 40 of the magic tee 36 or can be reflected back into space by a backshort in the sum port 40 of the magic tee 36.

Figure 7A:
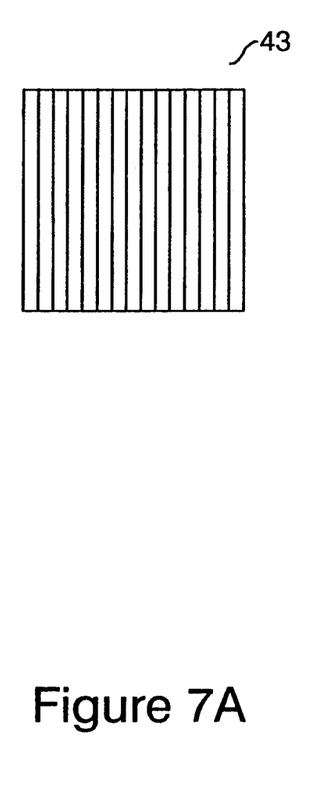
FIGS. 7A and 7B show two designs for a backshort used in the invention.
Figure 7B:
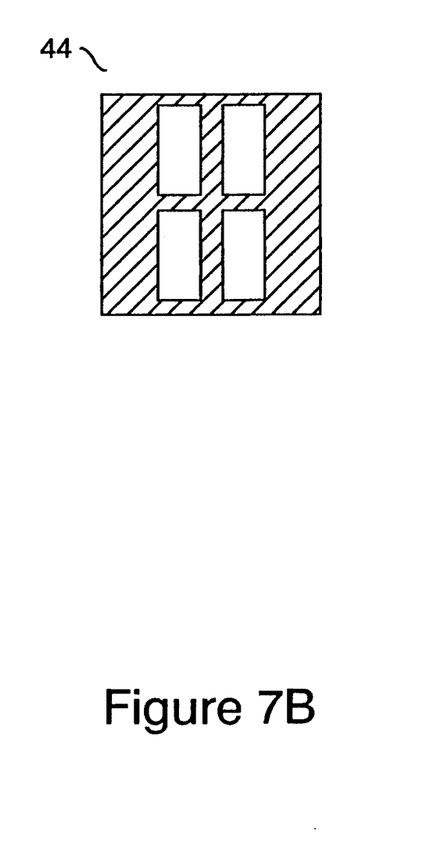

Horizontally and vertically polarized modes of the incident signals 25 can be isolated by using a backshort 42 (FIG. 5) which reflects vertically polarized modes of the incident signals 25 but transmits horizontally polarized modes of the incident signals 25. Such a backshort 42 can be formed with a vertical wire grid 43 (FIG. 7A) or rectangular waveguides (FIG. 7B) 44 of monopulse comparator 45 (FIG. 6) since the rectangular waveguides (FIG. 7B) 44 are turned ninety degrees from the vertical signals. Consequently, those vertically polarized components of the incident signals 25 penetrate either the opposing rectangular waveguide apertures 30 or reflect off backshort 42 and add with the polarization of the incident signal 25 already in the opposite rectangular waveguide aperture 30.

Coupler 34 (FIG. 6) is designed to cancel the reactive energy generated by the colliding signals from the opposing rectangular waveguide apertures 30 and the standing waves 46 (FIG. 5) by adjusting the placement of backshort 42. Coupler 34 (FIG. 6) operates most efficiently when the enclosed region of the coupler 34 is large enough to allow propagation of the vertical component of the incident signal 25 and the next symmetric higher order mode. Backshort 42 is positioned in coupler 34 to reflect the fundamental vertical component of the incident signal 25 in phase for adding in coupler 34 and to reflect the undesirable higher order modes of the vertical component of the incident signal 25 for cancellation in coupler 34. This configuration eliminates the undesirable higher order modes. An alternative method of cancelling these higher order modes is to feed them into a smaller waveguide designed by decreasing the area of backshort 42 with stepdowns 48. The decreased backshort area allows independent control of the travel distance for the fundamental and higher order modes of the incident signals 25, because of stepdowns 48, so the higher order modes can be resonated out.

The horizontally polarized modes of the incident signals 25 transmit through the backshort, designed to reflect only vertically polarized modes of incident signals 25, and are processed by the monopulse comparator 45. Target identification

I claim:

1. A dually polarized monopulse feed system for processing radar signal information from a target so the target may be identified and tracked, the system comprising:
   a symmetrical multimode input waveguide;
   a coupler to process vertical modes of signal wave polarizations;
   a monopulse comparator to process horizontal modes of signal wave polarizations;
   means for rejecting and terminating selected modes of signal wave polarizations; and
   a back short for reflecting selected modes of signal wave polarizations.

2. The dually polarized monopulse feed system of claim 1, wherein the coupler comprises:
   opposing rectangular apertures extending orthogonally from a rectangular waveguide, the opposing rectangular apertures separating vertically polarized modes of signal waves from horizontally polarized modes of signal waves;
   a magic tee for combining the vertically polarized modes of signal waves separated by the opposing rectangular apertures; and
   a backshort for reflecting selected vertically polarized modes of signal waves.

3. The dually polarized monopulse feed system of claim 2, wherein the opposing rectangular apertures include a backshort for reflecting selected vertically polarized modes of signal waves and transmitting horizontally polarized modes of signal waves.

4. The dually polarized monopulse feed system of claim 2, wherein the backshort comprises multiple waveguides of the monopulse-comparator.

5. The dually polarized monopulse feed system of claim 4, wherein the backshort includes stepdowns in the monopulse comparator for independent tuning of the vertical modes of signal wave polarizations.

6. The dually polarized monopulse feed system of claim 4, wherein the backshort comprises a vertical wire grid.

7. The dually polarized monopulse feed system of claim 1, wherein the symmetrical multimode input waveguide comprises an antenna for capturing radar signals.

8. The dually polarized monopulse feed system of claim 7, wherein the antenna comprises a horn.

9. The dually polarized monopulse feed system of claim 2, wherein the opposing rectangular apertures are sized to reflect selected vertically polarized modes of signal waves.

10. The dually polarized monopulse feed system of claim 1, wherein the radar signal information is at millimeter wave radar frequencies.

11. The dually polarized monopulse feed system of claim 1, wherein the system has a three cubic inch volume.

12. The dually polarized monopulse feed system of claim 1, wherein the backshort is positionable to tune out reactance values of selected polarized modes of signal waves.

* * * * *